UNITED STATES PATENT OFFICE.

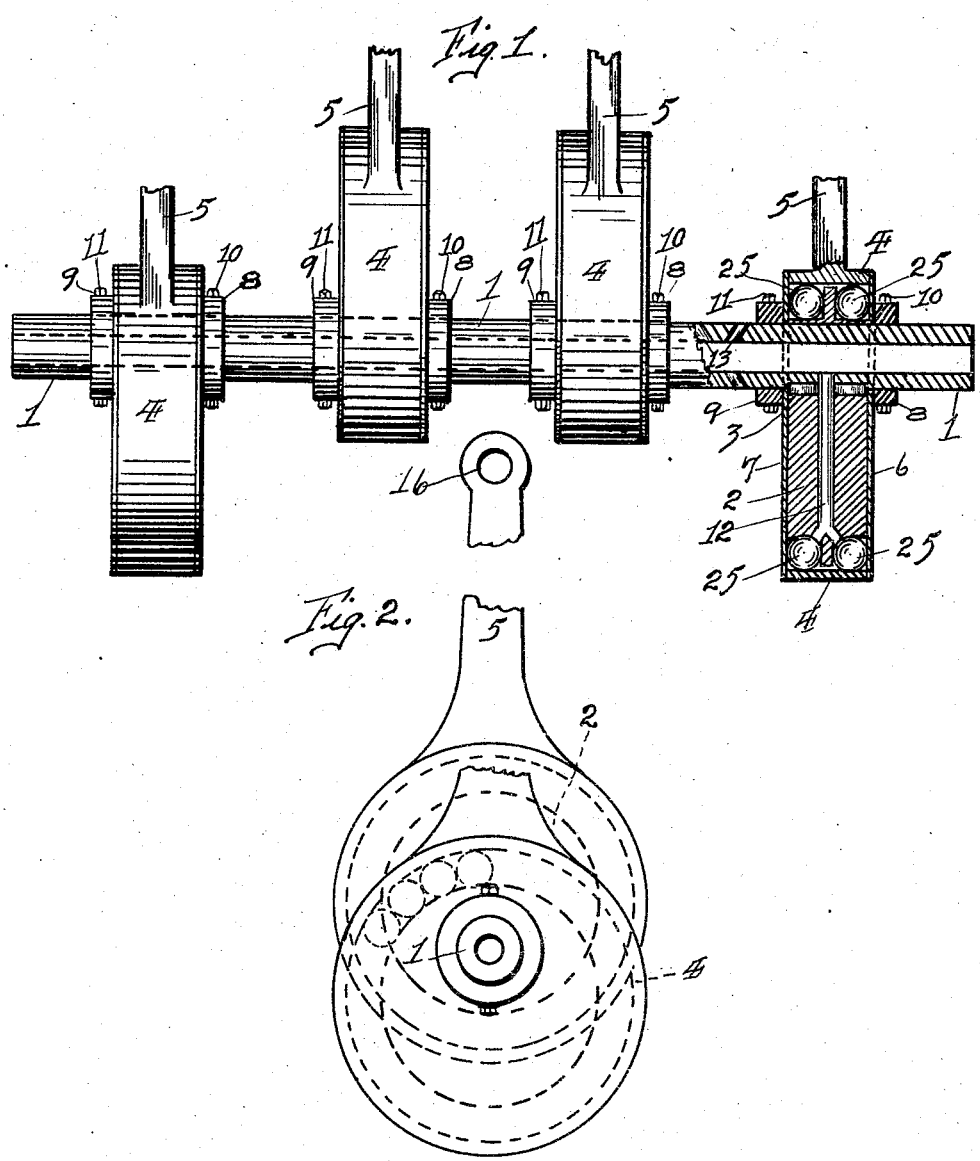

RICHARD SCHMITZ, OF CHICAGO, ILLINOIS, ASSIGNOR TO SCHMITZ ENGINE COMPANY, A CORPORATION OF SOUTH DAKOTA.

ECCENTRIC.

1,183,774.  Specification of Letters Patent.  Patented May 16, 1916.

Application filed March 20, 1911. Serial No. 615,722.

*To all whom it may concern:*

Be it known that I, RICHARD SCHMITZ, a citizen of the United States, resident of Chicago, county of Cook, and State of Illinois, have invented a certain new Eccentric, of which the following is the specification.

It is well known to persons skilled in the art, that one of the most expensive parts of an engine is the crank shaft, due both to the expense of making the forging and the cost of machining it.

My invention has for its object, to produce an engine shaft which will avoid both of the above objectionable features, and which will be capable of acting as a fly-wheel, all of the parts being located within the crank case of the engine and avoiding the necessity of a fly-wheel on the outside thereof and will also possess numerous desirable ones which will appear from the hereinafter contained description.

My new engine shaft is shown in the accompanying drawings which are hereunto annexed, and are a part of this specification, in which—

Figure 1 is a side elevation, one end of the shaft being broken away showing the remaining portion in section. Fig. 2 is an end view.

Similar reference numerals refer to similar parts throughout the entire description.

As shown in the drawings, 1 is a shaft, formed of seamless steel tubing.

2 indicates eccentrics which are mounted upon the shaft 1. As shown in the drawings, they are secured in position by means of a key 3, though it is obvious that any means of attaching an eccentric to a shaft may be employed.

4 is the eccentric strap or collar, which is shown in the form of a ring, but any form may be used which will effect the purpose without deviating from the spirit of my invention.

The rod 5 extends upwardly and terminates in a bearing 16 for the piston pin. The strap 4, as shown in the drawing, is mounted upon ball bearings 25, which are held in place by means of plates 6 and 7. When it is desirable to provide an internal fly-wheel on my new engine shaft, I construct these plates, as more clearly shown in detailed views Figs. 3 and 4. This construction, as shown in practice effectively does away with the necessity of a fly-wheel outside of the crank case, and in many instances is very desirable. These plates are secured in position by means of collars 8 and 9, which are fastened to the shaft 2, by means of bolts 10 and 11, though any other form of fastener may be employed for this purpose.

Although in the drawing I have shown ball bearings, it is apparent that roller bearings may be employed when desired, as I do not wish to limit myself to the precise construction as shown in the drawing, except in the fact that the same represents a new engine shaft, in which the connecting rod extending from the piston, does not pass the center of the shaft, at or during any portion of the stroke.

The eccentrics are provided with an internal passage 12 for the purpose of conveying oil to the bearings which it is intended should be supplied to the interior of the shaft 1. The said passage operates to provide for the thorough oiling of the eccentric bearings while for the purpose of providing for the oiling of the other moving parts, I form a plurality of openings 13 which are preferably drilled at an angle, so that the oil which should be under pressure will be thrown out of said openings, due both to the pressure and to the centrifugal force upon the piston pin, and will in this manner effectually spray all the moving parts in the interior in the crank case.

An engine shaft constructed in this manner possesses numerous advantages which will be apparent to persons skilled in the art, upon inspection of the drawings and description, among which, may be named cheapness in original cost, ease of manufacture inasmuch as the machine work is practically all straight lathe work and assembly, and ease of effecting a perfect balance of the rotating parts as it is obvious to any persons skilled in the art that no counterweights are required, as is the case where a crank shaft of the usual construction is employed.

Having described my invention, what I claim as new and desire to secure by Letters Patent is:

1. In combination with an engine shaft, a connecting rod, means for providing a connection between the connecting rod and shaft, said means comprising a disk mounted eccentrically on the shaft, a plate adjacent each side of the disk, a circular strap housed by the plates, said strap being arranged in spaced relation with the disk, a circumferential flange on the disk for dividing the spaces between the strap and disk into independent bearing race ways and ball bearings positioned in the ways.

2. In combination with a hollow engine shaft, a connecting rod, means for providing a connection between the connecting rod and shaft, said means comprising a disk, said disk having a central bore extending to the periphery thereof, said bore being in communication with the hollow shaft, a plate adjacent each side of the disk, a circular strap housed by the plates, said strap being arranged in spaced relation with the disk to form a race way, a flange for dividing the race way into independent race ways, and ball bearings positioned in the ways.

In witness whereof I have signed the foregoing specification.

RICHARD SCHMITZ.

Witnesses:
C. M. BAUMEISTER,
K. SOLBEY.

Copies of this patent may be obtained for five cents each, by addressing the "Commissioner of Patents, Washington, D. C."